United States Patent
Bissinger et al.

(10) Patent No.: US 7,678,859 B2
(45) Date of Patent: Mar. 16, 2010

(54) PREPARATION AND STABILIZATION OF FLUOROPOLYMER DISPERSIONS

(75) Inventors: Peter Bissinger, Diessen (DE); Michael C. Dadalas, Eggenfelden (DE); Klaus Hintzer, Kasti (DE); Ludwig Mayer, Burgkirchen (DE); Werner Schwertfeger, Altoetting (DE); Tilman C. Zipplies, Burghausen (DE)

(73) Assignee: 3M Innovative Properties Company, St. Paul, MN (US)

( * ) Notice: Subject to any disclaimer, the term of this patent is extended or adjusted under 35 U.S.C. 154(b) by 279 days.

(21) Appl. No.: 11/531,745

(22) Filed: Sep. 14, 2006

(65) Prior Publication Data

US 2008/0097060 A1    Apr. 24, 2008

(51) Int. Cl.
     *C08L 27/12*    (2006.01)
(52) U.S. Cl. .................. 524/544; 524/188; 524/265; 524/267; 524/545; 524/546; 524/805
(58) Field of Classification Search .................. 524/544, 524/545
     See application file for complete search history.

(56) References Cited

U.S. PATENT DOCUMENTS

| | | | |
|---|---|---|---|
| 3,635,926 A | 1/1972 | Gresham et al. | |
| 3,642,742 A | 2/1972 | Carlson | |
| 3,855,191 A | 12/1974 | Doughty, Jr. et al. | |
| 3,879,302 A * | 4/1975 | Reick | 508/138 |
| 4,262,101 A | 4/1981 | Hartwimmer et al. | |
| 4,439,385 A | 3/1984 | Kuhls et al. | |
| 4,588,796 A | 5/1986 | Wheland | |
| 4,680,331 A | 7/1987 | Suzuki et al. | |
| 4,861,845 A | 8/1989 | Slocum et al. | |
| 5,430,167 A | 7/1995 | Klein et al. | |
| 5,453,477 A | 9/1995 | Oxenrider et al. | |
| 5,663,255 A | 9/1997 | Anolick et al. | |
| 5,750,589 A | 5/1998 | Zech et al. | |
| 5,969,063 A | 10/1999 | Parker et al. | |
| 6,861,490 B2 | 3/2005 | Kaspar et al. | |
| 2001/0018535 A1 * | 8/2001 | Klein et al. | 556/489 |
| 2005/0154104 A1 * | 7/2005 | Malvasi et al. | 524/379 |

FOREIGN PATENT DOCUMENTS

| | | |
|---|---|---|
| EP | 0 649 863 A1 | 4/1995 |
| EP | 0964009 | 7/2003 |
| EP | 1 462 461 A1 | 9/2004 |
| GB | 1520421 A * | 8/1978 |
| JP | 46-11031 | 3/1971 |
| JP | 61-34032 | 2/1986 |
| RU | 2 158 274 C1 | 10/2000 |
| WO | WO 96/24622 | 8/1996 |
| WO | WO 97/17381 | 5/1997 |
| WO | WO 97/28381 | 8/1997 |
| WO | WO 02/088203 A2 | 11/2002 |
| WO | WO 02/088206 A2 | 11/2002 |
| WO | WO 02/088207 A1 | 11/2002 |

* cited by examiner

*Primary Examiner*—Mark Eashoo
*Assistant Examiner*—Nicole M Buie
(74) *Attorney, Agent, or Firm*—Dena M. Ehrich; C. Michael Geise

(57) ABSTRACT

Provided is a method comprising polymerizing at least one fluorinated monomer in an aqueous emulsion polymerization in the presence of a carbosilane surfactant having at least one hydrophobic part, wherein the hydrophobic part has at least one silicon atom, and having at least one hydrophilic part, with the proviso that the carbosilane contains no Si—O bonds.

14 Claims, No Drawings

PREPARATION AND STABILIZATION OF FLUOROPOLYMER DISPERSIONS

BACKGROUND

Fluoropolymers, i.e. polymers having a fluorinated backbone, have been long known and have been used in a variety of applications because of several desirable properties such as heat resistance, chemical resistance, weatherability, UV-stability etc. The various fluoropolymers are for example described in "Modern Fluoropolymers", edited by John Scheirs, Wiley Science 1997. Commonly known or commercially employed fluoropolymers include polytetrafluoroethylene (PTFE), copolymers of tetrafluoroethylene (TFE) and hexafluoropropylene (HFP) (FEP polymers), perfluoroalkoxy copolymers (PFA), ethylene-tetrafluoroethylene (ETFE) copolymers, terpolymers of tetrafluoroethylene, hexafluoropropylene and vinylidene fluoride (THV) and polyvinylidene fluoride polymers (PVDF) and others. Commercially employed fluoropolymers include fluoroelastomers and thermoplastic fluoropolymers.

Several methods are known to produce fluoropolymers. Such methods include suspension polymerization as disclosed in e.g. U.S. Pat. No. 3,855,191, U.S. Pat. No. 4,439,385 and EP 649863; aqueous: emulsion polymerization as disclosed in e.g. U.S. Pat. No. 3,635,926 and U.S. Pat. No. 4,262,101; solution polymerization as disclosed in U.S. Pat. No. 3,642,742, U.S. Pat. No. 4,588,796 and U.S. Pat. No. 5,663,255; polymerization using supercritical $CO_2$ as disclosed in JP 46011031 and EP 964009 and polymerization in the gas phase as disclosed in U.S. Pat. No. 4,861,845.

Currently, the most commonly employed polymerization methods include suspension polymerization and aqueous emulsion polymerization. Aqueous emulsion polymerization normally involves polymerization in the presence of a fluorinated surfactant. The suspension polymerization generally does not involve the use of surfactant and results in substantially larger polymer particles than in case of the aqueous emulsion polymerization. Thus, the polymer particles formed during suspension polymerization settle out of the reaction mixture whereas the dispersions obtained in emulsion polymerization generally exhibit good stability over a long period of time.

An aqueous emulsion polymerization wherein no surfactant is used has been described in U.S. Pat. No. 5,453,477, WO 96/24622 and WO 97/17381 to generally produce homo- and copolymers of chlorotrifluoroethylene (CTFE). For example, WO 97/17381 discloses an aqueous emulsion polymerization in the absence of a surfactant wherein a radical initiator system of a reducing agent and oxidizing agent is used to initiate the polymerization and whereby the initiator system is added in one or more further charges during the polymerization. So-called emulsifier free polymerization has further been disclosed in WO 02/88206 and WO 02/88203. In the latter PCT application, the use of dimethyl ether or methyl tertiary butyl ether is taught to minimize formation of low molecular weight fractions that may be extractable from the fluoropolymer. WO 02/88207 teaches an emulsifier free polymerization using certain chain transfer agents to minimize formation of water-soluble fluorinated compounds. An emulsifier free polymerization is further disclosed in RU U.S. Pat. No. 2,158,274 for making an elastomeric copolymer of hexafluoropropylene and vinylidene fluoride.

Notwithstanding the fact that emulsifier free polymerizations are known, the aqueous emulsion polymerization process to produce fluoropolymers is generally preferred because it can yield stable fluoropolymer particle dispersions in high yield and in a more environmental friendly way than for example polymerizations conducted in an organic solvent. Frequently, the emulsion polymerization process is carried out using a fluorinated surfactant, particularly a perfluoroalkanoic acid or salt thereof as a surfactant. These surfactants are typically used because they provide a wide variety of desirable properties such as high speed of polymerization, good copolymerization properties of fluorinated olefins with comonomers, desirable stability, and good polymerization yields, i.e. a high amount of solids can be produced. However, environmental concerns have been raised against these and other fluorinated surfactants and moreover these surfactants are generally expensive. In particular, perfluorinated alkanoic acids having 8 or more carbon atoms are known to be bioaccumulating.

EP Application 1,462,461 describes using siloxane surfactants to prepare halogen-containing polymers.

SUMMARY

The present inventors have recognized a continuing need for alternative surfactants to fluorinated surfactants for the emulsion polymerization of fluorinated monomers. In particular, non-fluorinated surfactants may provide an environmentally advantageous alternative to fluorinated surfactants. In one aspect, the present inventors have found that the use of a small amount of carbosilane surfactant in the polymerization of fluorinated monomers may yield a fluoropolymer having smaller particle size and higher solids content than polymerizations conducted in the absence of surfactants. Further, the polymerizations can provide these fluoropolymers in commercially acceptable yields and polymerization times.

In one aspect, the present invention relates to a method comprising polymerizing at least one fluorinated monomer in an aqueous emulsion polymerization in the presence of a carbosilane surfactant having at least one hydrophobic part, wherein the hydrophobic part has at least one silicon atom, and having at least one hydrophilic part, with the proviso that the carbosilane contains no Si—O bonds (that is, no bonds between silicon and oxygen).

In another aspect, polymerizing at least one fluorinated monomer yields a fluorinated polymer dispersion wherein the fluorinated polymer is selected from a thermoplastic fluoropolymer and an elastomeric fluoropolymer.

In yet another aspect, the present invention relates to a fluoropolymer dispersion comprising a fluoropolymer and a carbosilane surfactant having at least one hydrophobic part, wherein the hydrophobic part has at least one silicon atom, and having at least one hydrophilic part, with the proviso that the carbosilane contains no Si—O bonds (that is, no bonds between silicon and oxygen).

DETAILED DESCRIPTION

The aqueous emulsion polymerization process described herein can be used to produce polymers that have a partially or fully fluorinated backbone. In particular, the aqueous emulsion polymerization process can be used to produce homo- and copolymers of gaseous fluorinated olefinic monomers such as tetrafluoroethylene, vinylidene fluoride and chlorotrifluoroethylene. Suitable comonomers include fluorinated monomers such as hexafluoropropene, perfluoro vinyl ethers including perfluoroalkyl vinyl ethers (e.g., perfluoromethyl vinyl ether and perfluoro-n-propylvinyl ether)

and perfluoroalkoxy vinyl ethers such as those corresponding to the following formula:

wherein $R^a$ and $R^b$ are each independently selected from a linear or branched perfluoroalkylene group having from 2 to 6 carbon atoms, m and n are each independently from 0 to 10, with the proviso that the sum of n and m is at least 1, and $R^c$ is a perfluoroalkyl group of from 1 to 6 carbon atoms.

Other suitable monomers include the allyl ethers given by:

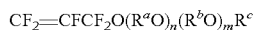

where $R^a$, $R^b$, $R^c$, m, and n have the same meanings described above.

Non-fluorinated monomers that can be used as comonomers include alpha-olefins, e.g. ethylene and propylene. Combinations of any of the above-named fluorinated monomers are also contemplated.

The methods of the invention can also be used to produce fluoroelastomers as well as fluorothermoplasts.

In particular embodiments, the methods of the present invention may be used to produce a polymer selected from:

(i) a homopolymer of vinylidene fluoride;
(ii) a copolymer of vinylidene fluoride and tetrafluoroethylene;
(iii) a copolymer of vinylidene fluoride and hexafluoropropylene;
(iv) a terpolymer of vinylidene fluoride, tetrafluoroethylene, and hexafluoropropylene;
(v) a quadpolymer of vinylidene fluoride, tetrafluoroethylene, hexafluoropropylene, and a hydrocarbon alpha-olefin having from 2 to 9 carbon atoms;
(vi) a copolymer of tetrafluoroethylene and a hydrocarbon alpha-olefin having from 2 to 9 carbon atoms;
(vii) a copolymer of hexafluoropropylene and a hydrocarbon alpha-olefin having from 2 to 9 carbon atoms;
(viii) a terpolymer of tetrafluoroethylene, hexafluoropropylene, and a hydrocarbon alpha-olefin having from 2 to 9 carbon atoms; and
(ix) a homopolymer of tetrafluoroethylene having a melt flow index (ISO-12086-2) at 372° C. of greater than 0.1 g/10 min at a load of 10 kg.

The aqueous emulsion polymerization is typically initiated by an initiator including any of the initiators known for initiating a free radical polymerization of fluorinated monomers. Suitable initiators include peroxides and azo compounds and redox based initiators. Specific examples of peroxide initiators include, hydrogen peroxide, sodium or barium peroxide, diacylperoxides such as diacetylperoxide, disuccinoyl peroxide, dipropionylperoxide, dibutyrylperoxide, diglutaric acid peroxide, and further per-acids and salts thereof such as e.g. ammonium, sodium or potassium salts. Examples of per-acids include peracetic acid. Esters of the peracid can be used as well. Examples of inorganic initiators include for example ammonium- alkali- or earth alkali salts of persulfates, permanganic or manganic acid or manganic acids.

A persulfate initiator, e.g. ammonium persulfate (APS), may be used alone or may be used in combination with a reducing agent. Suitable reducing agents include bisulfites such as for example ammonium bisulfite or sodium metabisulfite, thiosulfates such as for example ammonium, potassium or sodium thiosulfate, hydrazines, azodicarboxylates and azodicarboxyldiamide (ADA). Further reducing agents that may be used include sodium formaldehyde sulfoxylate (Rongalit®, available from BASF, Germany) or fluoroalkyl sulfinates. The reducing agent typically reduces the half-life time of the persulfate initiator. Additionally, a metal salt catalyst such as for example copper, iron or silver salts may be added.

The amount of initiator may be from 0.0001% by weight (based on the fluoropolymer solids to be produced) to 1% by weight. In one embodiment, the amount of initiator is from 0.0005 to 0.5% by weight. In another embodiment, the amount may be from 0.005 to 0.3% by weight.

The aqueous emulsion polymerization system may further comprise other materials, such as buffers and, if desired, complex-formers or chain-transfer agents. When present, chain transfer agents are typically present in small amounts so as to not interfere with the preparation of high molecular weight polymers. Examples of chain transfer agents that can be used include ethers, such as dimethyl ether, and methyl t-butyl ether; alkanes having 1 to 5 carbon atoms such as ethane, propane and n-pentane; halogenated hydrocarbons such as $CCl_4$, $CHCl_3$ and $CH_2Cl_2$ and hydrofluorocarbon compounds; and alcohols.

The achievable solids content of the polymer dispersion is typically from 5 to 40% without any major coagulum. For instance, the solids content may be up to 15%, up to 25%, or even up to 30%. In other embodiments, the solids content may be from 5%, from 10%, even from 15% and higher.

The resultant dispersions are highly stable and generally have a number average particle diameter of not more than 400 nm. Typically, between 50 and 350 nm average particle sizes can be achieved.

The method described herein comprises polymerizing at least one fluorinated monomer in an aqueous emulsion polymerization in the presence of a carbosilane. In some embodiments, the carbosilane may be characterized in that:

1) it may have one or more hydrophobic parts in the molecule;
2) it may have at least one hydrophobic part, wherein the hydrophobic part has at least one silicon atom;
3) it may have one or more hydrophilic parts in the molecule;
4) it contains no Si—O bonds (including no Si—O—Si bonds);
5) it may have an ionic or non-ionic hydrophilic part; and
6) it is insensitive to reaction with fluoride ion, for instance, from hydrofluoric acid.

In some embodiments, the carbosilanes have an advantage over siloxane surfactants, in that the carbosilanes are more resistant to reaction with fluoride ion, for instance, from hydrofluoric acid. Fluoride ion is normally present in the preparation of fluoropolymers. The chemical resistance to reactivity with fluoride ions provides an advantage for using the carbosilanes in the methods described herein.

In yet further embodiments, the carbosilane may contain hydroxyl groups or other protic groups in the hydrophilic part. For instance, the hydrophilic part may further comprise sulfonic acid groups, carboxylic acid groups, or combinations thereof.

In some embodiments, the hydrophilic part of the molecule comprises an ionic group. The ionic group may comprise, for instance, one or more carboxylate groups, one or more sulfonate groups, one or more sulfate groups, or some combination thereof.

Surprisingly, the carbosilane of the present invention allows for the polymerization of fluorinated monomers without the use of fluorinated surfactants. For instance, in yet further embodiments, the methods described may include polymerizing in an aqueous medium that contains less than 100 ppm of perfluorinated alkanoic acids. In other embodiments, the aqueous medium may contain less than 50 ppm, less than 10 ppm, or even 0 ppm fluorinated emulsifiers (e.g., perfluoroalkanoic acids including, for instance, perfluorooctanoic acid).

In other embodiments, the carbosilane of the present invention may be present in very low amounts, especially compared to the amounts of fluorinated surfactant typically used in emulsion polymerization processes. For instance, the carbosilane may be present in an amount of up to 1 weight percent, up to 0.5 weight percent, or even up to 0.1 weight percent based on the weight of the aqueous phase. Furthermore, the carbosilane may be present in an amount of from 0.0001 weight percent, from 0.001 weight percent, from 0.01 weight percent, or even from 0.1 weight percent based on the weight of the aqueous phase. In this context the "weight of the aqueous phase" refers to the weight of the water used in the reaction medium and does not include the mass of the other water-soluble or water-insoluble materials.

In some embodiments, the carbosilane may be selected from those having general formula (I):

$$Q\text{-}P\text{---}(OC_nH_{2n})_x\text{---}O\text{-}T \qquad (I)$$

wherein Q is selected from $R_3Si$— and $R_3Si$—$(R'$—$Si(R)_2)_a$—$R'$—$Si(R'')_2$—, where each R is independently selected from an aliphatic group having from 1 to 18 carbon atoms, a cycloaliphatic group having from 6 to 12 carbon atoms, and an aromatic group having from 6 to 12 carbon atoms. R' is an alkylene group having from 1 to 14 carbon atoms. R'' is R when a≠0 or is selected from R and $R_3SiR'$ when a=0. The value of a is from 0 to 2. P is selected from an alkylene group having from 1 to 18 carbon atoms (e.g., from 2 to 14 carbon atoms) and AR''', wherein A is an alkylene group having from 1 to 18 carbon atoms and R''' is a functional group selected from —NHC(O)—, —NHC(O)(CH$_2$)$_{n-1}$—, —NHC(O)C(O)—, —NHC(O)(CH$_2$)$_v$C(O)—, —OC(O)—, —OC(O)(CH$_2$)$_{n-1}$—, —OC(O)C(O)—, —OC(O)(CH$_2$)$_v$C(O)—, —OCH$_2$CH(OH)CH$_2$OC(O)(CH$_2$)$_{n-1}$—, and —OCH$_2$CH(OH)CH$_2$OC(O)(CH$_2$)$_v$C(O)—;

where v is from 1 to 12, T is selected from H, a alkyl radical having from 1 to 10 carbon atoms, and an acyl radical having from 1 to 4 carbon atoms. From formula (I), x is from 1 to 200 and n is from 1 to 6.

In further particular embodiments, the carbosilane is selected from formula (II):

$$Q'\text{-}(P\text{---}(OC_nH_{2n})_x\text{---}O\text{-}T)_2 \qquad (II)$$

wherein Q' is —$SiR_2$—X—$SiR_2$—, X is a linear or branched alkylene group or cycloalkylene group which optionally bear one or more oxygen-containing groups; and wherein all of the other symbols have the same meaning as for formula (I).

Other particular embodiments include those wherein the carbosilane is selected from formula (III):

$$Q\text{-}P\text{---}(OC_nH_{2n})_x\text{---}O\text{---}P\text{-}Q \qquad (III)$$

wherein each symbol has the same meaning as for formula (I).

In yet further particular embodiments, the carbosilane is selected from formula (IV):

$$Q''\text{-}(P\text{---}(OC_nH_{2n})_x\text{---}O\text{-}T)_o \qquad (IV)$$

where Q'' is an oligomeric or polymeric carbosilane wherein at least one silicon atom is substituted by the radical —(P—(OC$_n$H$_{2n}$)$_x$—O-T). Thus, o is at least one. All other symbols have the same meaning as for formula (I).

In a particular embodiment, the carbosilane has the structure (V):

$$(CH_3)((CH_3)_3SiCH_2)_2\text{---}Si\text{---}CH_2CH_2CH_2\text{---}O\text{---}(CH_2CH_2O)_n\text{---}CH_3 \qquad (V)$$

In the above structure (V), n is typically around 10. For instance, n can be from 5 to 20, from 5 to 15, even from 7 to 12.

Carbosilanes described herein can be made by methods generally known in the art, for instance, as described in U.S. Pat. No. 5,750,589.

In further embodiments, the methods described herein may further comprise adding an anionic surfactant, a non-ionic surfactant, or a combination thereof to the fluoropolymer dispersions produced by the above-described methods.

Anionic non-fluorinated surfactants that may be used in connection with this invention include surfactants that have an acid group, in particular a sulfonic or carboxylic acid group. Examples of non-fluorinated anionic surfactants include surfactants that have one or more anionic groups. Anionic non-fluorinated surfactants may include in addition to one or more anionic groups, other hydrophilic groups such as polyoxyalkylene groups having 2 to 4 carbons in the oxyalkylene group (e.g., polyoxyethylene groups).

Typical non-fluorinated surfactants include anionic hydrocarbon surfactants. The term "anionic hydrocarbon surfactants" as used herein comprises surfactants that include one or more hydrocarbon moieties in the molecule and one or more anionic groups, in particular acid groups such as sulfonic, sulfuric, phosphoric and carboxylic acid groups and salts thereof. Examples of hydrocarbon moieties of the anionic hydrocarbon surfactants include saturated and unsaturated aliphatic groups having for example 6 to 40 carbon atoms, preferably 8 to 20 carbon atoms. Such aliphatic groups may be linear or branched and may contain cyclic structures. The hydrocarbon moiety may also be aromatic or contain aromatic groups. Additionally, the hydrocarbon moiety may contain one or more hetero-atoms such as for example oxygen, nitrogen and sulfur.

Particular examples of anionic hydrocarbon surfactants for use in this invention include alkyl sulfonates such as lauryl sulfonate, alkyl sulfates such as lauryl sulfate, alkylarylsulfonates and alkylarylsulfates, fatty (carboxylic) acids and salts thereof such as lauric acids and salts thereof and phosphoric acid alkyl or alkylaryl esters and salts thereof. Commercially available anionic hydrocarbon surfactants that can be used include Polystep™ A16 (sodium dodecylbenzyl sulphonate) from Stepan Company, Germany; Hostapur™ SAS 30 (secondary alkyl sulphonate sodium salt), Emulsogen™ LS (sodium lauryl sulfate) and Emulsogen™ EPA 1954 (mixture of $C_{12}$ to $C_{14}$ sodium alkyl sulfates) each available from Clariant GmbH, Germany; Edenor C-12 (Lauric acid) available from Cognis, Germany; and TRITON™ X-200 (sodium alkylsulfonate) available from Dow Chemical, Midland, Mich. Further suitable anionic surfactants include the sulfosuccinates disclosed in EP 1538177 and EP 1526142. Preferred are anionic hydrocarbon surfactants having a carboxylic acid group.

Further anionic surfactants include, for instance, those of formula (VI):

$$[A\text{-}CH(R^3)\text{---}(CH_2)_nR^3]_iM^{i+} \qquad (VI)$$

wherein A is an anionic group, M is a cation having a valence of i; i is from 1 to 3; each $R^3$ is independently selected from H and an acyl group of the formula —$CO_2R^4$, wherein $R^4$ is selected from a linear alkyl group having from 1 to 20 carbon atoms and a branched alkyl group having from 1 to 20 carbon atoms; and n is from 0 to 40.

Suitable non-fluorinated non-ionic surfactants include those described in "Nonionic Surfactants", M. J. Schick (ed.), Marcel Dekker, Inc., New York 1967. Examples of non-ionic surfactants can be selected from the group of alkylarylpolyethoxy alcohols, polyoxyalkylene alkyl ether surfactants, polysorbates and alkoxylated acetylenic diols, preferably ethoxylated acetylenic diols, and mixtures of such surfactants.

Typically, the non-ionic surfactant or non-ionic surfactant mixture used will have an HLB (hydrophilic lypophilic balance) between 11 and 16. The HLB number was introduced by W. C. Griffin "Calculation of HLB Values of Non-Ionic Surfactants," *Journal of the Society of Cosmetic Chemists* 5 (1954), p. 259 to characterize surfactants. The HLB number of non-ionic surfactants having only ethyleneoxide groups can be calculated according to the formula HLB=E/5 where E represents the weight % of ethyleneoxide groups. In case of a mixture of surfactants, the HLB value can be calculated according to the formula:

$$HLB = \sum_{i=1}^{n} HLB_i * w_i.$$

wherein $HLB_i$ represents the HLB of surfactant i and $w_i$ represents the weight fraction of surfactant i in the surfactant mixture and n represents the number of different surfactants making up the surfactant mixture.

In particular embodiments, the non-ionic surfactant or mixture of non-ionic surfactants corresponds to the general formula (VII):

$$R^1\text{—O—}[CH_2CH_2O]_n\text{—}[R^2O]_m\text{—}R^3 \quad\quad\quad (VII)$$

wherein $R^1$ represents a linear or branched aliphatic or aromatic hydrocarbon group having at least 8 carbon atoms, preferably 8 to 18 carbon atoms, $R^2$ represents an alkylene having 3 carbon atoms, $R^3$ represents hydrogen or a $C_1$-$C_3$ alkyl group, n has a value of 0 to 40, m has a value of 0 to 40 and the sum of n+m is at least 2. When the above general formula represents a mixture, n and m will represent the average amount of the respective groups. Also, when the above formula represents a mixture, the indicated amount of carbon atoms in the aliphatic group $R^1$ may be an average number representing the average length of the hydrocarbon group in the surfactant mixture. Commercially available non-ionic surfactant or mixtures of non-ionic surfactants include those available from Clariant GmbH under the brand GENAPOL™ such as GENAPOL™ X-080 and GENAPOL™ PF 40. Further suitable non-ionic surfactants that are commercially available include Tergitol™ TMN 6 or Tergitol™ TMN 100X, Tergitol™ TMN 10, and Triton® X-100 (available from Dow Chemical).

According to a further embodiment, a mixture of one or more surfactants according to formula (VII) in which m is 0 with one or more surfactants according to formula (VII) with n and m each being non-zero can be used. An example of such a mixture is a mixture of GENAPOL™ X-080 and GENAPOL™ PF40.

In a still further embodiment, one or more polysorbates may be used optionally in combination with one or more surfactants according to formula (VII). Polysorbates are ethoxylated sorbitan fatty esters and are well known as emulsifiers. Useful polysorbates include polysorbate 20, polysorbate 40, polysorbate 60 and polysorbate 80. The structure of polysorbate 80 is disclosed in e.g. EP 1452571.

Polysorbate 20, 40 and 60 have a very similar structure as polysorbate 80. Polysorbate 20, is a laurate ester of sorbitol and its anhydrides having approximately twenty moles of ethylene oxide for each mole of sorbitol and sorbitol anhydrides. Polysorbate 40 is a palmitate ester of sorbitol and its anhydrides having approximately twenty moles of ethylene oxide for each mole of sorbitol and sorbitol anhydrides. Polysorbate 60 is a mixture of stearate and palmitate esters of sorbitol and its anhydrides having approximately twenty moles of ethylene oxide for each mole of sorbitol and sorbitol anhydrides.

Further non-ionic surfactants that can be used include alkoxylated acetylenic diols, for example ethoxylated acetylenic diols. The ethoxylated acetylenic diols for use in this embodiment preferably have a HLB between 11 and 16. Commercially available ethoxylated acetylenic diols that may be used include those available under the SURFYNOL brand from Air Products, Allentown, Pa. (e.g., particular SURFYNOL™ 465). Still further useful non-ionic surfactants include polysiloxane based surfactants such as Silwet® L77 (Crompton Corp., Middlebury, Conn.)

Amine oxides are also considered useful as stabilizing additives to the fluoropolymer dispersions described herein. Useful amine oxides include, for instance, those described by the general formula:

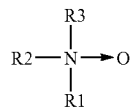

When added to a dispersion created according to the method described herein, the anionic surfactant, non-ionic surfactant, or combination thereof can increase the shelf-life of the dispersion. By increase the shelf-life is meant that the half life for sedimentation of the solids in the dispersion is increased. For instance, some dispersions of fluoropolymers that are prepared according to the present description show substantial sedimentation of the solids after one week of storage. With the addition of surfactant, the dispersions may be free of sedimentation for over one week, over 2 weeks, over 4 weeks, and even may be free of sedimentation for at least over two months. Such dispersions may exhibit stability even though, in some embodiments, they are free of fluorinated surfactants. These dispersions may contain, for instance, a copolymer of tetrafluoroethylene, hexafluoropropylene, and vinylidene fluoride (so-called THV polymer).

Further advantages of added anionic and/or non-ionic surfactant may include better processing capability of the dispersion.

For instance, such stabilized dispersions are capable of undergoing ultra-filtration, thermal concentration or a sedimentation process to increase the solids content of the dispersion, whereas, in some embodiments, the dispersions without the added surfactant are not sufficiently stable for such processing. In other embodiments, the stabilized dispersions may be suitable for use in coating applications such as the coating or impregnation of fabrics or in the coating of metal substrates (e.g., to make cookware).

In other embodiments, it has been found that the stabilization provided to fluoropolymer dispersions by anionic surfactants, non-ionic surfactants, and combinations thereof, is generally applicable to fluoropolymer dispersions prepared in the presence of non-perfluorinated surfactants. For instance, the stabilization step is useful in stabilizing fluoropolymers prepared in the presence of non-fluorinated hydrocarbon aliphatic or aromatic carboxylic emulsifiers, such as lauric acid, described, for instance, above.

Advantages and embodiments of this invention are further illustrated by the following examples, but the particular materials and amounts thereof recited in these examples, as well as other conditions and details, should not be construed to unduly limit this invention. All parts and percentages are by weight unless otherwise indicated.

EXAMPLES

Example 1

30 liters deionized water containing 2 g of the carbosilane surfactant:

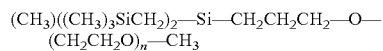

where n is 10, were fed in a 50 liter polymerization kettle together with 200 g NaOH and 40 mg $CuSO_4$. Air was removed by alternating evacuation and pressurizing with nitrogen up to 4 bar. Then the kettle was pressurized with 6.1 bar HFP, 5.2 bar VDF, 2.9 bar TFE and 1.3 bar ethane. The total pressure was 15.5 bar abs. The temperature in the vessel was adjusted to 70° C. The polymerization was initiated by pumping in the vessel an aqueous solution containing 36 g APS dissolved in 100 ml deionized water and a solution of 6 g $Na_2S_2O_5$ in 50 ml deionized water. The speed of agitation was 240 rpm. The polymerization temperature and pressure were kept constant by feeding TFE, HFP and VDF in a constant ratio of 1:0.443:0.855. When 5.5 kg TFE were consumed, polymerization was stopped by closing the monomer-feeding and lowering the speed of agitation. The vessel was vented and the resulting dispersion discharged. The thus obtained dispersion had a solid content of 29.4% and particle size of about 246 nm.

Example 2

A terpolymer of HFP/TFE/VDF (THV) was polymerized under using the carbosilane surfactant of Example 1. The solid content of the polymerized dispersion was 26.3%. It was attempted to upconcentrate the dispersion via ultrafiltration (UF). The upconcentration was not possible because of coagulation of the polymer.

Example 3

The dispersion of Example 2 was stabilized with 5.0% by weight lauric acid (Edenor C12, available from Cognis, Germany) based on solid content. The stabilized dispersion was successfully upconcentrated via UF to a solid content of 50.3%.

Example 4

The dispersion of Example 2 was stabilized with 5.0% of a secondary alkane sulfonate salt (Hostapur SAS 30, available from Clariant, Germany) active substance based on solid content. The stabilized dispersion was successfully upconcentrated via UF to a solid content of 49.5%.

Example 5

The dispersion of Example 2 was stabilized with 5.0% of a fatty alcohol polyglycol ether (Genapol X 080, Clariant) based on solid content. This stabilized dispersion was successfully upconcentrated via UF to a solid content of 51.2%.

Comparative Example 1

28 liters deionized water containing 12 g ammoniumoxalate and 2 g oxalic acid were fed in a 50 liter polymerization vessel. Air was removed by alternating evacuation and pressurizing with nitrogen up to 4 bar. Then the vessel was pressurized with 8.6 bar HFP, 1.9 bar VDF, 4.2 bar TFE and 0.8 bar ethane. The temperature in the vessel was adjusted to 60° C. Polymerization was initiated by continuously pumping in the vessel an aqueous solution containing 5 g $KMnO_4$ dissolved in 1000 ml deionized water. The polymerization was started by quickly pumping 111 ml in the vessel, then the pumping rate was lowered to 2.5 ml/min. The speed of agitation was 240 rpm. Polymerization temperature and pressure were kept constant by feeding TFE, HFP and VDF in a constant ratio of 1:0,412:0,488. When 2.5 kg TFE are consumed, polymerization is stopped by closing the monomer-feeding and lowering the speed of agitation. The vessel was vented and the resulting dispersion discharged. The thus obtained dispersion had a solid content of 13% and particle size of about 387 nm.

We claim:

1. A method comprising polymerizing at least one fluorinated olefinic monomer in an aqueous emulsion polymerization in the presence of a carbosilane surfactant having at least one hydrophobic part, wherein the hydrophobic part has at least one silicon atom, and having at least one hydrophilic part, with the proviso that the carbosilane contains no Si—O bonds, wherein the carbosilane is selected from those having the general formula (V):

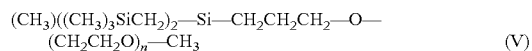 (V)

wherein n is selected from 5 to 20.

2. The method of claim 1 wherein the polymerizing takes place in an aqueous medium that is free of perfluorinated alkanoic acids.

3. The method of claim 1 wherein the carbosilane is present in an amount of from 0.0001 to 1.0 weight percent based on the weight of the aqueous phase.

4. The method of claim 1 wherein the at least one fluorinated olefinic monomer is selected so as to produce a polymer selected from:

(i) a homopolymer of vinylidene fluoride;
(ii) a copolymer of vinylidene fluoride and tetrafluoroethylene;
(iii) a copolymer of vinylidene fluoride and hexafluoropropylene;
(iv) a terpolymer of vinylidene fluoride, tetrafluoroethylene, and hexafluoropropylene;
(v) a quadpolymer of vinylidene fluoride, tetrafluoroethylene, hexafluoropropylene, and a hydrocarbon alpha-olefin having from 2 to 9 carbon atoms;
(vi) a copolymer of tetrafluoroethylene and a hydrocarbon alpha-olefin having from 2 to 9 carbon atoms;
(vii) a copolymer of hexafluoropropylene and a hydrocarbon alpha-olefin having from 2 to 9 carbon atoms;
(viii) a terpolymer of tetrafluoroethylene, hexafluoropropylene, and a hydrocarbon alpha-olefin having from 2 to 9 carbon atoms; and
(ix) a homopolymer of tetrafluoroethylene having a melt flow index (ISO-12086-2) at 372° C. of greater than 0.1 g/10 min at a load of 10 kg.

5. The method of claim 4 wherein the hydrocarbon alpha-olefin having from 2 to 9 carbon atoms is selected from ethylene and propylene.

6. The method of claim 1 wherein polymerizing at least one fluorinated olefinic monomer yields a fluorinated polymer dispersion wherein the fluorinated polymer is selected from a thermoplastic fluoropolymer and an elastomeric fluoropolymer.

7. The method of claim 6 further comprising adding an anionic surfactant, a non-ionic surfactant, or a combination thereof to the fluoropolymer dispersion.

8. The method of claim 7 wherein the anionic surfactant is selected from surfactants of formula (VI):

$$[A-CH(R^3)-(CH_2)_n R^3]_i M^{i+} \quad (VI)$$

wherein A is an anionic group, M is a cation having a valence of i; i is from 1 to 3; each $R^3$ is independently selected from H and an acyl group of the formula $-CO_2 R^4$, wherein $R^4$ is selected from a linear alkyl group having from 1 to 20 carbon atoms and a branched alkyl group having from 1 to 20 carbon atoms; and n is from 0 to 40.

9. The method of claim 8 wherein A is selected from a carboxylate, a sulfate, a phosphate, a phosponate, and a sulfonate.

10. The method of claim 9 wherein the fluoropolymer in the fluoropolymer dispersion is a terpolymer of tetrafluoroethylene, hexafluoropropylene, and vinylidene fluoride.

11. The method of claim 1 wherein polymerizing at least one fluorinated olefinic monomer yields a polymer dispersion having a solid content of up to 40%.

12. The method of claim 1 wherein polymerizing at least one fluorinated olefinic monomer yields a polymer dispersion having a number average particle size of up to 400 nm.

13. A method comprising polymerizing at least one fluorinated olefinic monomer in an aqueous emulsion polymerization in the presence of a carbosilane surfactant having at least one hydrophobic part, wherein the hydrophobic part has at least one silicon atom, and having at least one hydrophilic part, wherein the carbosilane is selected from those having the general formula (I):

$$Q\text{-}P\text{---}(OC_n H_{2n})_x\text{---}O\text{-}T \quad (I)$$

wherein Q is selected from $R_3Si-$ and $R_3Si-(R'-Si(R)_2)_a-R'-Si(R'')_2-$; each R is independently selected from an aliphatic group having from 1 to 18 carbon atoms, a cycloaliphatic group having from 6 to 12 carbon atoms, and an aromatic group having from 6 to 12 carbon atoms; R' is an alkylene group having from 1 to 14 carbon atoms; R'' is R when a $\neq 0$ and is selected from R and $R_3 SiR'$ when a=0; the value of a is from 0 to 2; P is selected from an alkylene group having from 1 to 18 carbon atoms and AR''', wherein A is an alkylene group having from 1 to 18 carbon atoms and R''' is a functional group selected from $-NHC(O)-$, $-NHC(O)(CH_2)_{n-1}-$, $-NHC(O)C(O)-$, $-NHC(O)(CH_2)_v C(O)-$, $-OC(O)-$, $-OC(O)(CH_2)_{n-1}-$, $-OC(O)C(O)-$, $-OC(O)(CH_2)_v C(O)-$, $-OCH_2 CH(OH)CH_2 OC(O)(CH_2)_{n-1}-$, and $-OCH_2 CH(OH)CH_2 OC(O)(CH_2)_v C(O)-$; where v is from 1 to 12; T is selected from H, a alkyl radical having from 1 to 10 carbon atoms, and an acyl radical having from 1 to 4 carbon atoms; x is from 1 to 200 and n is from 1 to 6.

14. A method comprising polymerizing at least one fluorinated olefinic monomer in an aqueous emulsion polymerization in the presence of a carbosilane surfactant having at least one hydrophobic part, wherein the hydrophobic part has at least one silicon atom, and having at least one hydrophilic part, wherein the carbosilane is selected from those having the general formula (II):

$$Q'\text{-}(P\text{---}(OC_n H_{2n})_x\text{---}O\text{-}T)_2 \quad (II)$$

wherein Q' is $-SiR_2-X-SiR_2-$, X is selected from a linear alkylene group, a branched alkylene group, a cycloalkylene group, a linear alkylene group bearing one or more oxygen containing groups, a branched alkylene group bearing one or more oxygen containing groups, and a cycloalkylene group bearing one or more oxygen containing groups; P is selected from an alkylene group having from 1 to 18 carbon atoms and AR''', wherein A is an alkylene group having from 1 to 18 carbon atoms and R''' is a functional group selected from $-NHC(O)-$, $-NHC(O)(CH_2)_{n-1}-$, $-NHC(O)C(O)-$, $-NHC(O)(CH_2)_v C(O)-$, $-OC(O)-$, $-OC(O)(CH_2)_{n-1}-$, $-OC(O)C(O)-$, $-OC(O)(CH_2)_v C(O)-$, $-OCH_2 CH(OH)CH_2 OC(O)(CH_2)_{n-1}-$, and $-OCH_2 CH(OH)CH_2 OC(O)(CH_2)_v C(O)-$; where v is from 1 to 12; T is selected from H, a alkyl radical having from 1 to 10 carbon atoms, and an acyl radical having from 1 to 4 carbon atoms; x is from 1 to 200 and n is from 1 to 6.

* * * * *